US005364595A

United States Patent [19]

Smith

[11] Patent Number: 5,364,595

[45] Date of Patent: Nov. 15, 1994

[54] PIPETTE DEVICE CONSTRUCTED TO PREVENT CONTAMINATION BY AEROSOLS OR OVERPIPETTING

[75] Inventor: Michael W. Smith, Fairburn, Ga.

[73] Assignee: Porex Technologies Corp., Fairburn, Ga.

[21] Appl. No.: 85,330

[22] Filed: Jul. 2, 1993

[51] Int. Cl.[5] .......................... B01L 3/02; G01N 1/14

[52] U.S. Cl. .................................... 422/100; 422/101; 73/863.23; 73/864.11; 73/864.13; 73/864.18

[58] Field of Search .............................. 422/100, 101; 73/864.01, 864.11, 864.13, 864.14, 864.15, 864.16, 864.18, 863.23, 863.25; 436/180

[56] References Cited

U.S. PATENT DOCUMENTS 3,810,391 5/1974 Suovaniemi ...................... 73/864.14
3,827,305 8/1974 Gilson et al. ...................... 73/864.14
3,985,032 10/1976 Avakion ........................... 73/864.14
3,995,496 12/1976 Bickford ........................... 73/864.14
4,054,062 10/1977 Bronham .......................... 73/864.14
4,059,020 11/1977 Avakian ........................ 73/864.14 X
4,261,205 4/1981 Oshikubo et al. .............. 422/100 X
4,263,257 4/1981 Metsälä73 ............................ 864.18/
4,283,950 8/1981 Tervamäki ...................... 422/100 X
4,418,580 12/1983 Satchell et al. ............. 73/864.14 X
4,461,328 7/1984 Kenney .......................... 422/100 X
4,483,825 11/1984 Fatches ............................. 422/100
4,554,134 11/1985 Tervamäki et al. ................. 422/100
4,873,059 10/1989 Kido et al. ................... 73/864.16 X
4,999,164 3/1991 Puchinger et al. .......... 73/863.25 X
5,156,811 10/1992 White .............................. 73/864.11

*Primary Examiner*—James C. Housel
*Assistant Examiner*—Milton I. Cano
*Attorney, Agent, or Firm*—Lane, Aitken & McCann

[57] ABSTRACT

In a pipette device, a suction device applies suction to a pipette tip to draw liquid into the pipette tip. A porous plastic plug is mounted in the pipette tip to prevent contamination of the suction device by the liquid sample. The median pore size in the porous plastic plug ranges from 3 microns to an upper limit which varies with the hydrophobicity of the material of the plug.

9 Claims, 1 Drawing Sheet

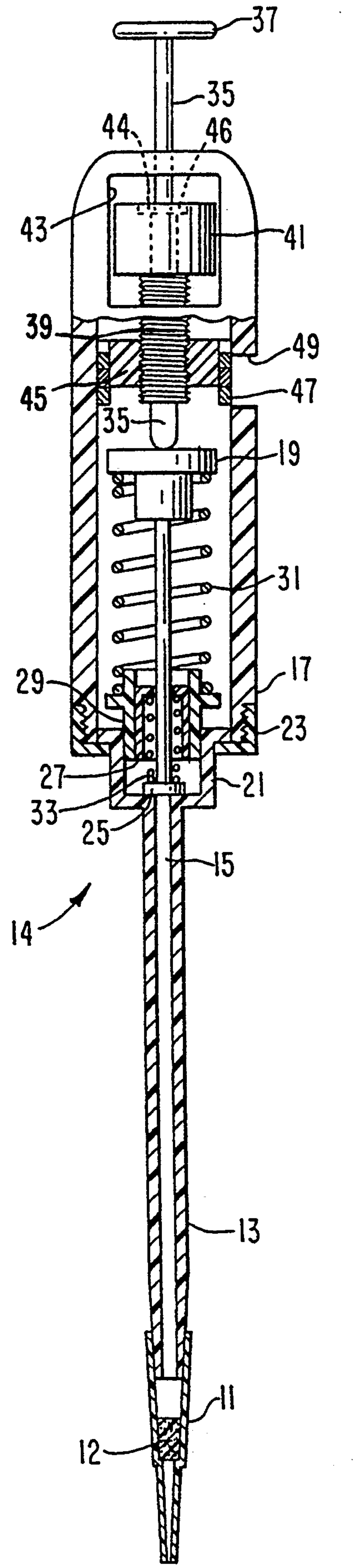
37
35
44
46
43
41
39
49
45
47
35
19
31
29
17
23
27
21
33
25
15
14
13
11
12

PIPETTE DEVICE CONSTRUCTED TO PREVENT CONTAMINATION BY AEROSOLS OR OVERPIPETTING

This invention relates to pipette devices of the type having a suction device for drawing liquid, such as blood serum, into a pipette and expelling the liquid from the pipette and more particularly to a pipette device designed to prevent contamination of the suction device by aerosols or overpipetting.

BACKGROUND OF THE INVENTION

Pipettes are standard laboratory apparatus used to transfer liquids from one vessel to another, or to a slide, or to other sample receiving medium. A pipette is basically a hollow tubular vessel open at both ends and the liquid to be transported is drawn into the tubular vessel by applying suction to the upper end. The liquid inside the vessel is forced out by the application of positive air pressure to the upper end of the vessel. Thus, in operation, liquid is first sucked into the vessel and then blown out of the vessel. For many years, the suction was applied to a pipette by mouth. This method has largely been abandoned because of health concerns. In modern pipette devices, the suction is applied by a flexible bulb or by a piston moving in a cylinder or a handheld vacuum gun that uses a small vacuum pump to suck the fluid into the pipette. Dispensing from the pipette is generally achieved by reversal of the action that created the suction.

The device of the present invention is designed to be used preferably in a pipette device in which the suction is provided by a spring-loaded piston moving up and down within a cylinder. The travel of the piston controls the volume of the fluid drawn into the pipette and dispensed from the pipette and the volume is adjustable by adjusting the piston travel.

In this manner, a precise volume of liquid can be drawn into the pipette and dispensed. A problem exists in that the suction device in pipette devices often become contaminated. One known source of contamination is overpipetting wherein the liquid being drawn into the pipette is sucked up into the suction device. It is also suspected that aerosols are generated from the liquid when the liquid is drawn into the pipette and these aerosols flow up into the suction device and contaminate it. Simple observation of the liquid in the pipette confirms this suspicion. When the liquid is moving through the pipette tip orifice, droplets of the liquid are caused to jump upwardly in an uncontrolled manner generating aerosols of the liquid. Also, aerosols can be generated when the liquid is dispensed from liquid left on the inner wall of the tip during the dispensing and this liquid is then subsequently sprayed up into the interior of the pipette and, ultimately, into the suction device when the suction device is allowed to return in a rapid manner to its home position drawing air into the tip of the pipette. In addition, fluid on the interior walls of the pipette tip during sequential pipettings forms thin films on the inner wall of the pipette tip. These films can migrate up the pipette tip inner wall surface above the column of liquid in the pipette and burst generating aerosols when the surface tension is insufficient to hold them on the inner wall of the tip. Pipetters typically use a pipette tip which attaches onto the barrel of a tube which contains a piston to apply suction to and expel a sample from the pipette tip. Thus, a contaminated pipette tip can be replaced with a new pipette tip for transporting a different liquid. However, the aerosols easily travel beyond the tip and up into the tube barrel contaminating this part of the system. In addition, if overpipetting takes place wherein the liquid sample is drawn up into the barrel of the suction device, catastrophic contamination occurs. Once the suction device is contaminated, new samples will pick up contamination from the previous samples even when a clean pipette tip is used. The carry over contamination can be a source of error in the on-going and subsequent assay procedures. In DNA applications wherein the DNA replicates in an exponential manner as well as in microbiological and radioactive pipetting procedures using hazardous fluid, cross-contamination from previous liquids cannot be tolerated. Moreover, if the barrel or suction device becomes contaminated, it may be impractical or impossible to clean and decontaminate it and thus the suction apparatus becomes unusable.

To avoid the aerosol problem, manufacturers of pipette devices have employed a porous media in the pipette tip to block aerosols of the pipetted liquid from reaching the suction device. The porous media allows the passage of air, but is intended to block the passage of liquid aerosols. Porous plastic is a particular suitable material for this application and several manufacturers are selling pipette tips with porous plastic plugs for the purposes of aerosol prevention. Porous plastic plugs are effective in blocking the passage of aerosols, but most of them do not prevent the flow of liquid into the suction device in the event of overpipetting.

To avoid this latter problem, a porous plastic plug has been developed which includes a self-sealing additive that seals off immediately when contacted by an aqueous liquid. Such a device is effective both in preventing aerosols and preventing contamination from overpipetting. However, the self-sealing additives to the porous plastic plugs contain sodium or other compounds which themselves are potential sample contaminants. For example, aerosols created on the initial aspiration of the liquid can come into contact with the porous plug and pick up sodium from the self-sealing additive and then fall back into the sample. In this manner, the sample would become seriously contaminated. Such sample contamination is often an expensive problem because some samples can cost thousands of dollars.

If overpipetting occurs, the liquid in the pipette tip comes into contact with the plug and causes the plug to seal itself closed. It then becomes impossible to extract the liquid from the pipette tip without cutting the pipette tip apart.

The self-sealing materials employed in the porous plastic plugs cannot be autoclaved to sterilize the pipette tips because the moisture induced by autoclaving will activate the self-sealing additive and cause the plug to seal itself off.

SUMMARY OF THE INVENTION

In accordance with the present invention, the problems with the prior art devices are overcome by using a porous plastic plug without any self-sealing additives in the pipette tip. The device of the invention differs from the prior art devices in that the pore size in the porous plastic plug is made substantially smaller so that the liquid sample cannot be drawn through the porous plastic plug by the suction device and a substantially higher pressure drop occurs across the porous plug when the suction is being applied by the suction device to the pipette tip. Specifically, in accordance with the invention, the median pore size in the porous plastic plug ranges from a lower limit which varies with the axial length of the plug to an upper limit which varies with the hydrophobicity of the plastic plug. The median pore size dimension refers to its diameter. For porous plastic plugs made of polyethylene, the upper limit for the pore size range is 19 microns. For porous plastic plugs made of polytetrafluroethylene (PTFE), a pore size of 26.5 microns will be effective.

The upper limit on the pore size is critical because pore sizes greater than the upper limit will not prevent liquid from passing through the porous plastic plug in the case of overpipetting and causing contamination of the suction device. The lower limit on the pore size is also critical because if the pore size is smaller than the lower limit, the suction device does not achieve an accurate control of the volume of the pipetted liquid because of air leakage into the chamber above the porous plastic plug during the pipetting operation. Such leakage causes less than the selected amount of liquid to be drawn into the pipette tip. The minimum axial length for the porous plug is 0.067 inches and for this axial length, the minimum median pore size is 3 microns. A typical axial length for the porous plug is 0.25 inches and for this axial length, the minimum median pore size is 9 microns.

Because of the increased pressure drop across the porous plastic plug with smaller pores, the air flow through the plug is slowed down sufficiently that aerosoling tends not to occur.

BRIEF DESCRIPTION OF THE DRAWING

The single FIGURE of the drawing is a sectional view in elevation of the pipette device of the invention.

DESCRIPTION OF THE PREFERRED EMBODIMENTS

As shown in FIG. 1, the pipette device of the invention comprises a pipette tip 11 in which is mounted a porous plastic plug 12. The pipette tip is shown as being conical, but it may also have a cylindrical shape. The axial length of the porous plug 12 preferably should be as great or greater than the diameter to facilitate insertion in the pipette tip by automated equipment. The tip 11 is attached to a suction device 14 having a barrel 13 in which a rod 15 is slidably disposed to act as a piston in a cylinder. The rod 15 extends up into a housing 17 and a cap 19 is mounted on the upper end of the rod 15 within the housing 17. The upper end of the barrel 13 widens into the shape of a cup 21, which has an outwardly extending flange on its upper end engaged by a screw cap 23 screwed onto the lower end of the housing 17 to mount the barrel 13 on the lower end of the housing 17. A disk 25 is slidably disposed on rod 15 at the bottom of the cup 21. A cup-shaped slide 27 opening downwardly is slidably mounted on the rod 15 between the cap 19 and the disk 25. The slide 27 also makes sliding engagement within a spring holder 29 which has a cylindrical upper end and an outwardly extending flange spaced from its upper end. A first coil spring 31 is disposed around the rod 15 and extends between the cap 19 and the spring holder 29. The lower end of the spring 31 is positioned around the cylindrical upper end of the spring holder 29 in engagement with the flange of the spring holder 29. A second spring 33, substantially stiffer than the spring 31, surrounding a rod 15 extends from the upper end of the slide 27 within the walls of the cup-shaped portion of the slide 27 to the disk 25. The rod 15 can be slid down within the barrel 13 first against the force of the spring 31 until the bottom of the cap 19 engages the top of the slide 27 and then can be further slid into the barrel 13 against the greater compressive force of spring 33 until the slide 27 engages the disk 25. An actuator rod 35 is slidably mounted in the housing 17 and extends out of the upper end of the housing 17 to a head 37, on which thumb pressure can be exerted to force the rod 15 downwardly against the compressive force of first the spring 31 and then the spring 33. The rod 35 is axially slidable through a screw member 39, which is connected to a knurled knob 41 accessible to the user through openings on opposite sides of the housing, one of which, as shown in FIG. 1, is the opening 43. The rod 35 has a larger diameter at its lower end than at its upper end to define a shoulder 44 between the upper and lower rod sections. The upward sliding motion of the rod 35 is limited by the engagement of the shoulder 44 with a stop 46 at the upper end of the knob 41. The screw member 39 engages a threaded member 45 and, when the knob 41 is turned, the screw member 39 can be advanced upwardly or downwardly. With no downward pressure exerted on the head 37, the force of the springs 31 and 33 will push the rod 35 upwardly so that the shoulder 44 engages the stop 46 to set the home position for the rod 35. By turning the knob 41, this home position can be adjusted upwardly or downwardly.

To operate the device, the knob 41 is turned to adjust the home position of the rod 35 to a position corresponding to the desired amount of sample to be obtained. The rod 35 is then pressed downwardly until the cap 19 engages the slide 27. The spring 31 opposes the downward motion of the rod 35 with a force of 1 to 2.5 pounds. The engagement of the cap 19 with the slide 27 will be immediately detected because of the much greater compressive force of 5 to 10 pounds exerted by the spring 33. The lower end of the pipette tip 11 is then dipped in the liquid to be sampled and the rod 35 is allowed to return to its home position drawing liquid into the lower end of the pipette tip 11 below the porous plug 12. Since the amount of downward travel of the rod 15 is determined by the displacement from the home position to the position in which the cap 19 engages the slide 27, the amount of sample liquid drawn into the tip 11 will be precisely determined by the adjustment of the home position of the rod 35 and the rod 15 by the knob 41. To expel the liquid sample from the tip 11 to the receptacle to which it is being transported, the rod 35 is again depressed which will force the liquid out of the tip 11. The piston 15 might need to be depressed a little further to expel all the liquid from the tip 11 and this can be accomplished by exerting greater pressure on the rod 15 to compress the spring 33.

The screw 39 is operatively connected to indicator rings 47 and are driven by the screw 39 in the manner of an odometer. The rings 47 are provided with numerical indications observable through a window 49 and the numerical indication provided by the rings 47 varies linearly with the screw member 39 and is calibrated to provide an indication of the amount of the sample drawn into the tip 11 in tenths of microliters.

The above described suction device 14 for applying a suction to the tip 11 and expelling the sample from the tip 11 is available on the market from Rainin Instrument Co. of Woburn, Mass. and is similar to the device disclosed in U.S. Pat. No. 3,827,305 to Gilson et al.

When the sample is sucked into the pipette tip 11, the drawn-in air will pass through the porous plastic plug 12 and the plug 12 prevents any aerosols from passing into the piston barrel 13. However, in many prior art pipette devices, liquid can be drawn by the suction device up through the porous plug into the piston barrel, an action called overpipetting, and cause catastrophic contamination of the suction device. In one prior art pipette device, a liquid scavaging material, specifically cellulose gum, is impregnated through the pores of the porous plastic plug. When liquid comes into contact with the plug, the cellulose gum will absorb the liquid, block the pores, and prevent the liquid from passing through the plug. This action is effective in preventing overpipetting. However, aerosol liquid particles that form below the porous plug in the pipette tip can come into contact with the cellulose gum material in the pipette tip, absorb sodium and other materials from the cellulose material, and then fall back into the sample. In this manner, the sample becomes contaminated without knowledge of the user. In many laboratory tests, such as those involving genetics or radioactivity, such contamination, even in very minute quantities, cannot be tolerated. Moreover, once the pores in the porous plastic plug seal off the plug member, the porous plug cannot be used again and, in addition, the liquid drawn into the pipette tip cannot be expelled from the tip. The only way to extract the liquid sample from the tip once the plug becomes sealed is to cut the tip apart.

In the pipette device of the present invention, contamination of the suction device by overpipetting or by aerosols is prevented without the use of a material to absorb moisture in the porous plug. In accordance with the invention, the pore size of the porous plastic plug 12 is selected to be small enough to prevent liquid from being drawn through the porous plastic plug by the suction device 14. When the material of the porous plastic plug is polyethylene, which has a hydrophobicity which will be wetted by liquid having a surface tension of 35 dynes per centimeter, the median pore size which will prevent overpipetting is 19 microns. When the material of the porous plastic plug is PTFE, which has a hydrophobicity to wetted by a liquid having a surface tension of 18.59 per centimeter, a median pore size of 26.5 microns will prevent overpipetting.

The small pore size of the plastic plug combined with its hydrophobicity will prevent any liquid from being drawn through the porous plug by the vacuum applied by the piston 26. As a result, contamination of the piston barrel and piston by aerosols or by overpipetting is prevented and this prevention of contamination is achieved without the use of a water absorbing material in the porous plug. Thus, the disadvantages associated with the use of such an absorbent material are avoided.

The lower limit on the median pore size is depends upon the axial length of the porous plastic plug. If the pore size is too small, it will take too long for the vacuum to draw air through the porous plug 12 and draw liquid into the pipette tip 11. As a result, air can leak around rod 15 or between the barrel 13 and the pipette tip 13 and reduce the volume drawn into the tip 11 to less than the amount selected by the suction device. In many tests, it is critically important to have an accurately selected amount of liquid drawn into the pipette. Because of difficulties in handling the porous plugs, and, in particular, assembling the plugs into pipette tips with automatic equipment, the minimum axial length of the porous plastic plugs, as a practical matter, is about 0.067 inches. For a porous plastic plug with an axial length of 0.067 inches, the minimum median pore size which will not materially affect the accuracy of the sample volume is 3 microns. Accordingly, the minimum median pore size for the porous plastic plug of the invention is 3 microns. For a plug having an axial dimension of 0.125 inches, the minimum median pore size is 5 microns. A typical axial length for the porous plastic plug is 0.25 inches and, for plugs with this axial length, the minimum median pore size is 9 microns.

In addition to causing inaccuracy in the sample volume, the delay in filling the tip caused by extremely small pores in the plug 12 is annoyingly inconvenient.

Because of the reduced average pore size, an increased pressure drop is created across the plug 12 and the rate at which air can be expelled through the plug 12 and drawn up into the plug 12 is limited to a value low enough that aerosoling of the liquid due to rapid drawing in of a liquid sample or expelling of the residue of the sample liquid from the pipette tip is prevented. In addition, the porous plug 12 prevents any aerosol particles from passing through the plug 12.

As indicated above, the maximum median pore size for a polyethylene porous plug is 19 microns. The maximum median pore size that can be used to prevent overpipetting by the suction device depends upon the hydrophobicity of the material and for materials, such as PTFE, with greater hydrophobicity than polyethylene, a greater median pore size can be employed.

Instead of using PTFE for the porous plastic material, the hydrophobicity of a porous polyethylene plug can be increased by treating it with silicone or impregnating the porous plastic plug with PTFE to increase the maximum pore size above 19 microns. If the material has a hydrophobicity approximating that of PTFE, e.g., a material wetted by a liquid with a surface tension of about 19 dynes per centimeter, a median pore of about 26.5 microns will be effective.

As described above, the porous plastic plug employed in the pipette device of the present invention has a median pore size ranging from 5 microns to an upper limit which varies with the hydrophobicity of the plug. Porous polyethylene is a preferred material for the porous plug since it is relatively inexpensive. When porous polyethylene is used as the plug material, the preferred median pore size is 19 microns since this size will prevent overpipetting and minimizes the delay in drawing air through the porous plastic plug. When PTFE is used for the porous plastic plug, the preferred median pore size is 26.5 microns.

As described above, the porous plastic plug employed in the pipette device of the present invention prevents contamination of the suction device by aerosols and by overpipetting. This is achieved without the use of a cellulose gum or other similar material impregnated in the porous plastic plug. Thus, contamination of the sample by sodium or other material from the cellulose gum is avoided and sealing of the porous plastic plug by contact with the liquid sample is prevented. Accordingly, the sample can be expelled from the pipette tip even if the sample comes into contact with the porous plastic plug. In addition, because no cellulose gum or equivalent material is employed in the porous plastic plug, the pipette tip of the present invention can be autoclaved to sterilize it.

The above description is of preferred embodiments of the invention and modification may be made thereto without departing from the spirit and scope of the invention which is defined in the appended claims.

I claim:

1. A pipette device having a tubular tip defining a sample reservoir to receive a sample, a porous plastic plug mounted in said tubular tip above said reservoir, means for applying suction to the upper end of said tubular tip to draw air through said porous plastic plug and a liquid sample into said reservoir, said suction means including means for controlling the amount of the sample drawn into said reservoir to a precisely selected volume, the improvement wherein said porous plastic plug is constructed from a hydrophobic material which is non-self sealing and having a median pore size so as to prevent said suction device from drawing said sample through said porous plastic plug without self-sealing of said pore size of said porous plastic plug, whereby said median pore size ranges from 3 microns to an upper limit which depends upon the hydrophobicity of said porous plastic plug.

2. A pipette device as recited in claim 1, wherein said porous plastic plug comprises a material having a hydrophobicity, measured by the surface tension of liquid which will wet said material, of 35 dynes per centimeter and wherein said upper limit for said median pore size is 19 microns.

3. A pipette device as recited in claim 1, wherein the material of said porous plastic plug is polyethylene wherein said upper limit of said range of median pore size is 19 microns.

4. A pipette device as recited in claim 1, wherein the axial length of said porous plastic plug is 0.25 inches and the minimum median pore size is 9 microns.

5. A pipette device as recited in claim 1, wherein said suction device comprises a rod slidable in a barrel as a piston and wherein said means for controlling the precise amount of sample drawn into said reservoir comprises means to control the limit of travel of said rod in said barrel.

6. A pipette device as recited in claim 5, wherein said means for controlling the amount of sample drawn in said tubular tip to a precisely selected volume includes means to vary the amount of said precisely selected volume.

7. A pipette device as recited in claim 1, wherein the material of said porous plastic plug is polyethylene and the median pore size of said porous plastic plug is 19 microns.

8. A pipette device as recited in claim 1, wherein the material of said porous plastic plug is polytetrafluoroethylene and the median pore size of said porous plastic plug is about 26.5 microns.

9. A pipette device as recited in claim 1, wherein said porous plastic plug comprises a material having a hydrophobicity, measured by the surface tension of the liquid which will wet the material, of about 19 dynes per centimeter and wherein the median pore size of said porous plastic plug is about 26.5 microns.

* * * * *